United States Patent
Guo et al.

(10) Patent No.: US 12,367,500 B2
(45) Date of Patent: Jul. 22, 2025

(54) METHOD AND APPARATUS FOR ELECTING REPRESENTATIVE NODE DEVICE, COMPUTER DEVICE, AND STORAGE MEDIUM

(71) Applicant: TENCENT TECHNOLOGY (SHENZHEN) COMPANY LIMITED, Shenzhen (CN)

(72) Inventors: Rui Guo, Shenzhen (CN); Maocai Li, Shenzhen (CN); Zongyou Wang, Shenzhen (CN); Haitao Tu, Shenzhen (CN); Li Kong, Shenzhen (CN); Kaiban Zhou, Shenzhen (CN); Changqing Yang, Shenzhen (CN); Nan Wang, Shenzhen (CN); Yong Ding, Shenzhen (CN); Yifang Shi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 820 days.

(21) Appl. No.: 17/066,482

(22) Filed: Oct. 8, 2020

(65) Prior Publication Data
US 2021/0027310 A1  Jan. 28, 2021

Related U.S. Application Data

(63) Continuation of application No. PCT/CN2019/104159, filed on Sep. 3, 2019.

(30) Foreign Application Priority Data

Sep. 7, 2018  (CN) .......................... 201811046270.0

(51) Int. Cl.
G06Q 30/018  (2023.01)
G06F 16/23  (2019.01)
(Continued)

(52) U.S. Cl.
CPC ..... G06Q 30/0185 (2013.01); G06F 16/2365 (2019.01); G06F 16/2379 (2019.01);
(Continued)

(58) Field of Classification Search
CPC .. G06Q 30/0185; G06Q 40/02; G06Q 20/389; G06Q 2230/00; G06Q 20/065;
(Continued)

(56) References Cited

U.S. PATENT DOCUMENTS 9,875,510 B1 * 1/2018 Kasper ................... G06Q 40/12
2010/0115587 A1 * 5/2010 Kubota ............... H04L 63/0876
726/3

(Continued)

FOREIGN PATENT DOCUMENTS

CN   106878071 A   6/2017
CN   107005574 A   8/2017
(Continued)

OTHER PUBLICATIONS

Kejiao Li, Proof of Vote: A High-Performance Consensus Protocol Based on Vote Mechanism & Consortium Blockchain, 2017, IEEE (Year: 2017).*

(Continued)

*Primary Examiner* — Neha Patel
*Assistant Examiner* — Chunling Ding
(74) *Attorney, Agent, or Firm* — ANOVA LAW GROUP, PLLC

(57) ABSTRACT

A method for electing a representative node device performed by a first node device in a blockchain system includes: broadcasting candidate addition transaction data in the blockchain system, the candidate addition transaction data carrying credential data, the credential data being received from a target server and indicating that a first node device meets a qualification requirement for a candidate (Continued)

node device; storing the candidate addition transaction data on a target blockchain of a blockchain system when a plurality of node devices in the blockchain system verify the candidate addition transaction data by consensus; and participating in an election of the representative node device according to the candidate addition transaction data stored on the target blockchain.

18 Claims, 4 Drawing Sheets

(51) Int. Cl.
  *G06Q 40/02* (2023.01)
  *G06Q 20/38* (2012.01)
(52) U.S. Cl.
  CPC .......... *G06Q 40/02* (2013.01); *G06Q 20/389* (2013.01); *G06Q 2230/00* (2013.01)
(58) Field of Classification Search
  CPC .......... G06Q 20/3825; G06Q 20/3829; G06Q 20/10; G06F 16/2365; G06F 16/2379; G06F 21/64; G06F 16/182; H04L 9/50; H04L 67/1051; H04L 67/1097
  See application file for complete search history.

(56) References Cited

U.S. PATENT DOCUMENTS

| | | | |
|---|---|---|---|
| 2015/0220892 A1 | 8/2015 | Allen | |
| 2015/0310424 A1 | 10/2015 | Myers | |
| 2016/0027229 A1 | 1/2016 | Spanos et al. | |
| 2018/0121909 A1* | 5/2018 | Christidis | H04L 9/3236 |
| 2019/0163783 A1* | 5/2019 | Abrashkevich | G06F 16/23 |
| 2019/0173667 A1 | 6/2019 | Wang et al. | |
| 2019/0213821 A1* | 7/2019 | Davis | H04L 9/3239 |
| 2019/0238340 A1 | 8/2019 | Wang et al. | |
| 2019/0281026 A1* | 9/2019 | Mitchell | H04W 4/42 |
| 2020/0074029 A1* | 3/2020 | Date | G06Q 10/0637 |
| 2020/0074778 A1* | 3/2020 | Shapira | G07C 13/00 |
| 2021/0035095 A1* | 2/2021 | Wei | G06Q 40/12 |
| 2021/0209885 A1* | 7/2021 | Lundin | H04L 9/3239 |
| 2021/0234698 A1* | 7/2021 | Li | H04L 67/51 |
| 2021/0336776 A1* | 10/2021 | Bartolucci | H04L 9/3073 |

FOREIGN PATENT DOCUMENTS

| | | | | | |
|---|---|---|---|---|---|
| CN | 107078910 A | | 8/2017 | | |
| CN | 107124403 A | | 9/2017 | | |
| CN | 107146087 A | | 9/2017 | | |
| CN | 107395353 A | | 11/2017 | | |
| CN | 107579848 A | * | 1/2018 | | |
| CN | 108134706 A | | 6/2018 | | |
| CN | 108269090 A | | 7/2018 | | |
| CN | 109034813 A | | 12/2018 | | |
| CN | 111124643 A | | 5/2020 | | |
| KR | 20020071246 A | | 9/2002 | | |
| KR | 101837170 B1 | | 4/2018 | | |
| WO | WO-2019034969 A1 | * | 2/2019 | ............ | G06F 16/27 |
| WO | WO-2019213867 A1 | * | 11/2019 | ............ | G06Q 20/02 |

OTHER PUBLICATIONS

Andreas Antonopoulos, Mastering Bitcoin, O'Reilly Media, Inc., Dec. 2014 (Year: 2014).*
Andreas M. Antonopoulos, Mastering Bitcoin, 2014, O'Reilly Media, Inc. (Year: 2014).*
Kejiao Li, Proof of Vote: A High-Performance Consensus Protocol Based on Vote Mechanism & Consortium Blockchain, 2017, https://ieeexplore.ieee.org/stamp.jsp?tp=&arnumber=8291964 (Year: 2017).*
Korean Intellectual Property Office (KIPO) Office Action 1 for 20207033831 Apr. 12, 2022 15 Pages (including translation).
The World Intellectual Property Organization (WIPO) International Search Report for PCT/CN2019/104159 Nov. 26, 2019 5 Pages (including translation).
The State Intellectual Property Office of the People's Republic of China (SIPO) Office Action 1 for 201811046270.0 Oct. 12, 2019 3 Pages (including translation).
The European Patent Office (EPO) The Extended European Search report for 19858149.8 Sep. 24, 2021 8 Pages (including translation).
The State Intellectual Property Office of the People's Republic of China (SIPO) Office Action 1 for for 201910726167.9 Oct. 21, 2020 11 Pages (including translation).
Kejiao Li et al, "Proof of Vote: A High-Performance Consensus Protocol Based on Vote Mechanism & Consortium Blockchain," 2017 IEEE 19th International Conference on High Performance Computing and Communications; IEEE 15th International Conference on Smart City; IEEE 3rd International Conference on Data Science and Systems (HPCC/SmartCity/DSS), IEEE, Dec. 18, 2017 (Dec. 18, 2017). 8 pages.
Neo, "Election and Voting," Jul. 7, 2017 (Jul. 7, 2017), Retrieved from the Internet: URL: http://docs.neo.org/en-us/node/gui/vote.html, [retrieved on Oct. 16, 2018]. 6 pages.

* cited by examiner

METHOD AND APPARATUS FOR ELECTING REPRESENTATIVE NODE DEVICE, COMPUTER DEVICE, AND STORAGE MEDIUM

CROSS-REFERENCES TO RELATED APPLICATIONS

This application is a continuation application of PCT Patent Application No. PCT/CN2019/104159, filed on Sep. 3, 2019, which claims priority to Chinese Patent Application No. 201811046270.0, entitled "METHOD AND APPARATUS FOR ELECTING REPRESENTATIVE NODE DEVICE, COMPUTER DEVICE, AND STORAGE MEDIUM" filed with the National Intellectual Property Administration, PRC on Sep. 7, 2018, the entire contents of both of which are incorporated herein by reference.

FIELD OF THE TECHNOLOGY

The present disclosure relates to the field of blockchain technologies, and in particular, to a method and an apparatus for electing a representative node device, a computer device, and a storage medium.

BACKGROUND OF THE DISCLOSURE

In recent years, with the development of network technologies, a blockchain system is widely applied. The blockchain system may include a plurality of node devices. Each node device may store transaction data by using blocks and combine the blocks by sequentially connecting the blocks in chronological order into a chain data structure, to form a distributed ledger in the blockchain system.

At present, node devices may generate a block through the following process: When a transaction occurs on any node device, the node device may record transaction data and broadcast the transaction data in a blockchain system, so that other node devices in the blockchain system receive the transaction data. After the node devices in the blockchain system receive the transaction data, the node devices may package the transaction data to generate a new block, and perform verification on the new block by using a consensus mechanism. After the new block is verified, each node device may add the new block to a blockchain configured on nodes.

In the foregoing process in which the node devices generate a block, to improve working efficiency of the blockchain system, a representative node device may be elected to replace all the node devices in generating a block. However, any node device in the blockchain system may become a representative node device even though node devices can have different qualifications because the node devices are different in terms of performance or authority. In addition, there may be a malicious node device that constantly transmits erroneous information in the blockchain system. Once an unqualified node device or a malicious node device is elected as the representative node device, normal operation of the blockchain system is affected. In this case, there is an urgent need for a method for electing a representative node device that can ensure normal operation of the blockchain system.

SUMMARY

Embodiments of the present disclosure provide a method and an apparatus for electing a representative node device, a computer device, and a storage medium.

A method for electing a representative node device is provided. The method is performed by a first node device, the first node device being any node device in a blockchain system, and the method includes: broadcasting candidate addition transaction data in the blockchain system, the candidate addition transaction data carrying credential data, the credential data being received from a target server and indicating that a first node device meets a qualification requirement for a candidate node device; storing the candidate addition transaction data on a target blockchain of a blockchain system when a plurality of node devices in the blockchain system verify the candidate addition transaction data by consensus; and participating in an election of the representative node device according to the candidate addition transaction data stored on the target blockchain.

An apparatus for electing a representative node device is provided, including a memory and a processor coupled to the memory. The processor is configured to perform: broadcasting candidate addition transaction data in the blockchain system, the candidate addition transaction data carrying credential data, the credential data being received from a target server and indicating that a first node device meets a qualification requirement for a candidate node device; storing the candidate addition transaction data on a target blockchain of a blockchain system when a plurality of node devices in the blockchain system verify the candidate addition transaction data by consensus; and participating in an election of the representative node device according to the candidate addition transaction data stored on the target blockchain.

A non-transitory computer-readable storage medium is provided, storing computer-readable instructions, the computer-readable instructions, when executed by one or more processors of a first node device in a blockchain system, causing the one or more processors to perform the following operations: broadcasting candidate addition transaction data in the blockchain system, the candidate addition transaction data carrying credential data, the credential data being received from a target server and indicating that a first node device meets a qualification requirement for a candidate node device; storing the candidate addition transaction data on a target blockchain of a blockchain system when a plurality of node devices in the blockchain system verify the candidate addition transaction data by consensus; and participating in an election of the representative node device according to the candidate addition transaction data stored on the target blockchain.

Details of one or more embodiments of the present disclosure are provided in the accompanying drawings and description below. Other features, objectives, and advantages of the present disclosure will become apparent from the specification, the accompanying drawings, and the claims.

BRIEF DESCRIPTION OF THE DRAWINGS

To describe the technical solutions of the embodiments of the present disclosure more clearly, the following briefly describes the accompanying drawings required for describing the embodiments. Apparently, the accompanying drawings in the following description show only some embodiments of the present disclosure, and a person of ordinary skill in the art may still derive other accompanying drawings from the accompanying drawings without creative efforts.

DESCRIPTION OF EMBODIMENTS

To make the objectives, technical solutions, and advantages of the present disclosure clearer, the following further describes implementations of the present disclosure in detail with reference to the accompanying drawings.

Figure 1:
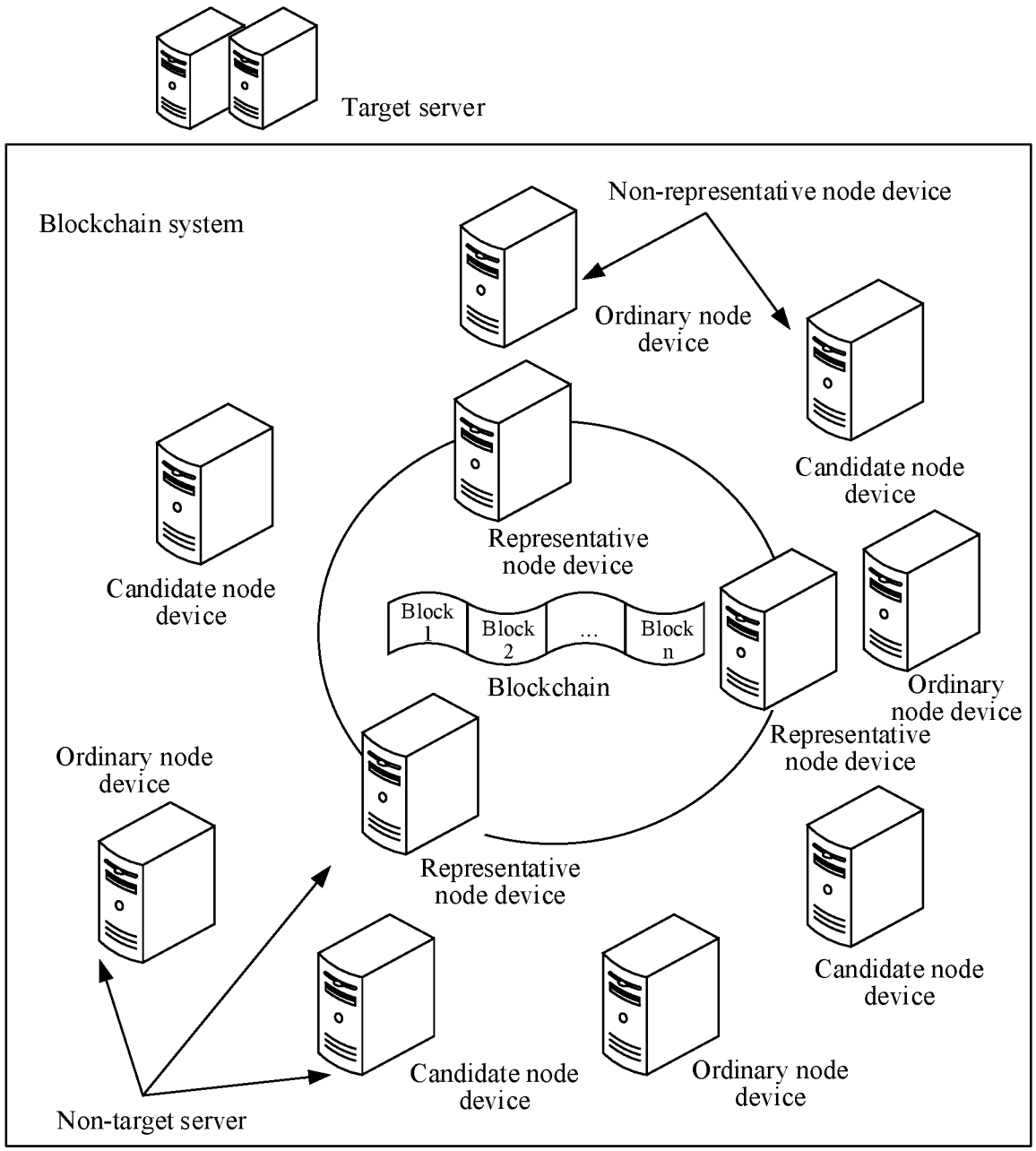
FIG. 1 is a schematic structural diagram of a blockchain system according to an embodiment of the present disclosure.

FIG. 1 is a schematic structural diagram of a blockchain system according to an embodiment of the present disclosure. Referring to FIG. 1, the blockchain system includes a plurality of node devices on which a same blockchain is configured. The plurality of node devices may be a plurality of servers of a same organization, a plurality of servers of different organizations, or a plurality of terminals of an individual user. This is not limited in the embodiments of the present disclosure. The term "a plurality of" mentioned in the embodiments of the present disclosure means "more than one".

All of the plurality of node devices can receive transaction data, but when blockchain system uploads the transaction data to the blockchain, because of different purposes, the node devices may be classified into representative node devices and non-representative node devices. A representative node device is configured to generate a block and perform verification on the block by consensus. A non-representative node device is configured to receive the block verified by the representative node device by consensus, perform verification on the block, and store the verified block on a target blockchain. Because of being different in terms of performance, the non-representative node devices may be classified into ordinary node devices and candidate node devices.

In addition, in the embodiments of the present disclosure, a target server is further provided, and the target server may serve as an auditor and be configured to receive a candidate application request transmitted by at least one node device in the blockchain system, perform a qualification audit on the node device based on the candidate application request, and generate credential data. The target server may transmit the credential data to the audited node device, so that the node device, by using the credential data that meets a preset rule, may become the candidate node device of the representative node device in the blockchain system.

In some embodiments, an example of a process of recording transaction data in the blockchain system is as follows: When any node device in the blockchain system receives the transaction data, the node device needs to broadcast the received transaction data in the blockchain system, to help another node device receive the transaction data. After the representative node device in the blockchain system receives the transaction data, the representative node device generates a block based on the transaction data, to help all representative node devices perform verification on the block by consensus. After the representative node devices verify the block by consensus, the representative node device broadcasts the block in the blockchain system. After receiving the block broadcast by the representative node device, the non-representative node device performs verification on the block. After being verified, the block is stored on the target blockchain configured on the non-representative node device.

The consensus included in the embodiments of the present disclosure means that a plurality of node devices in the blockchain system separately perform verification on data. When verification performed by any node device succeeds, a verification success message is broadcast in the blockchain system. When the verification success message received by any node device meets a preset consensus policy, it is determined that the data is verified by consensus.

For example, descriptions are provided by using an example in which verification by consensus is performed by the representative node devices in the blockchain system. The verification by consensus may be done through the proof of work (POW) mechanism. The process is described as follows: The representative node device in the blockchain system generates a block. The representative node device calculates a hash value of a block header of the generated block and determines whether the hash value is less than a current target value. When the hash value is greater than the target value, the representative node device changes a random number in the generated block and recalculates the hash value. When the hash value calculated by the representative node device is less than the current target value, the representative node device broadcasts a first block to other representative node devices or in the blockchain system. Other representative node devices perform verification on the first block after receiving the first block. When most of the other representative node devices all agree with validity of the first block, the first block is verified by consensus.

In the system provided in the embodiments of the present disclosure, it is unnecessary to check whether transaction data can be stored after all node devices in the blockchain system generate a block and most of the node devices in the blockchain system achieve a consensus on the generated block. Only if the representative node device generates a block and performs verification on the block by consensus, and the non-representative node device completes verification, transaction data can be recorded in the blockchain system, thereby improving working efficiency of the blockchain system.

Further, to reflect a process of electing a representative node device in the blockchain system, descriptions are provided below by using a specific embodiment.

Figure 2:
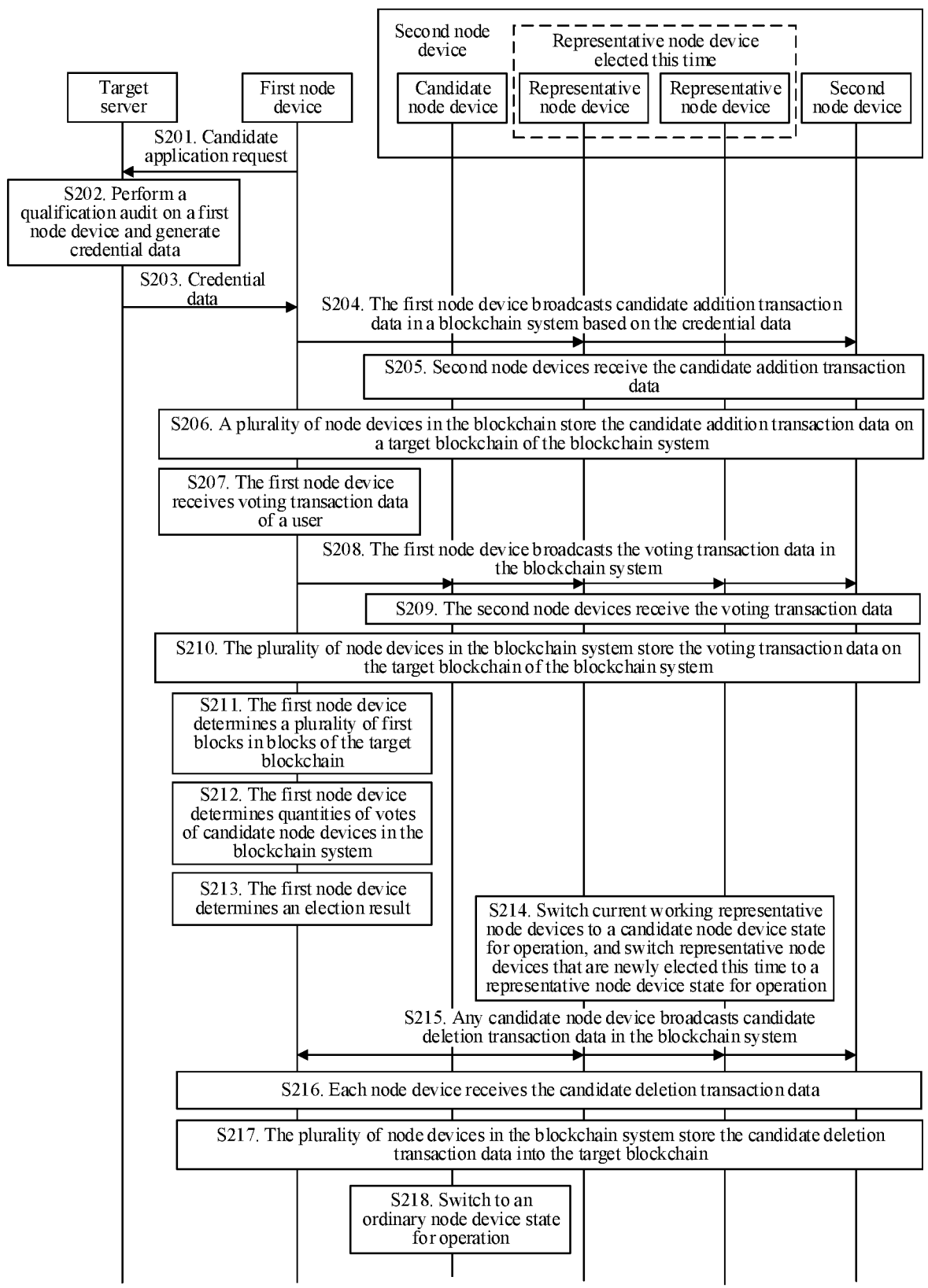
FIG. 2 is a flowchart of a method for electing a representative node device according to an embodiment of the present disclosure.

FIG. 2 is a flowchart of a method for electing a representative node device according to an embodiment of the present disclosure. Referring to FIG. 2, a process of the method according to one embodiment of the present disclosure includes the following steps.

S201. A first node device transmits a candidate application request to a target server, the candidate application request carrying qualification information of the first node device.

The first node device is any node device in the blockchain system. The target server is one or more servers in the blockchain system, or one or more servers outside the blockchain system. The target server may be equipped with at least one terminal device. A user as an auditor may log in to the terminal device to perform a qualification audit on the node device in the blockchain system. It may be understood that the target server may be any node device in the blockchain system, or a server of a third-party organization associated with the blockchain system.

The first node device transmits the candidate application request to the target server, to help the target server perform a qualification audit on the first node device based on the qualification information carried in the candidate application request, to check whether the first node device can become a candidate node device.

The qualification information of the first node device carried in the candidate application request may be any one of the following three qualifications: device performance of the first node device; a deposit of a preset amount that has been paid by the node device to the target server; and a credit value of a user account corresponding to the first node device. Certainly, the qualification information may alternatively include other content, and this is not limited in this embodiment.

If the blockchain system is currently in a process of a first election, the first node device may be a non-representative node device; and if a current election process of the blockchain system is not the first election process, the first node device is any ordinary node device. That is, the first node device is neither a representative node device, nor a candidate node device.

S202. The target server, after receiving the candidate application request, performs a qualification audit on the first node device and generates credential data when the first node device meets a qualification requirement for a candidate node device.

In this case, the first node device may be referred to as a first target node device. That is, when the first target node device meets the qualification requirement for the candidate node device, the credential data is generated. The credential data may be used for indicating that the first target node device meets the qualification requirement for the candidate node device.

The target server may transmit, after receiving the candidate application request, the qualification information carried in the candidate application request to at least one terminal device configured on the target server, to help the user perform a qualification audit on the node device through the terminal device.

A process of the qualification audit includes: when the qualification information meets the qualification requirement for the candidate node device, the audit is passed. For example, the audit is passed when device performance of the first node device meets a preset performance condition; or the audit is passed when the first node device has paid a deposit of a preset amount; or the audit is passed when credit of a user corresponding to the first node device meets a preset credit condition. When the first node device passes the qualification audit, the first node device is eligible to become the candidate node device. It may be understood that the first target node device may be any node device in the blockchain system. If the first target node device meets the qualification requirement for the candidate node device, the first target node device may be the first target node device.

When the qualification audit on the first node device (the first target node device) is passed, credential data is generated on the terminal device. The credential data may include a consent identifier, a generation time of a credential, a validity period of the credential, and a signature of the user. It may be understood that the target server may transmit, after receiving the candidate application request, qualification information carried in the candidate application request to a plurality of terminal devices configured on the target server, to help a plurality of users perform a qualification audit on the node device through the terminal devices. In addition, the credential data may include a plurality of consent identifiers, generation times of a plurality of credentials, validity periods of the plurality of credentials, and signatures of the plurality of users. The consent identifier refers to an identifier indicating that the user consents to let the first node device become the candidate node device; the validity period may be used for performing verification on validity of the credential data and preventing a non-representative node device from becoming a representative node device by using credential data maliciously obtained; and the signature is a signature added by the user to the qualification information. When the qualification audit on the first node device is not passed, the terminal device may not generate credential data. The terminal device transmits the generated credential data to the target server. The target server summarizes all pieces of credential data into a single piece of credential data. Certainly, the terminal device may alternatively feed back an audit result only to the target server. The target server generates credential data based on an audit result of the terminal device participating in the audit.

Alternatively, the target server may perform a qualification audit on the first node device. When the first node device passes the qualification audit of the target server, credential data is generated on the target server. The credential data includes: a consent identifier, a generation time of a credential, a validity period of the credential, and a signature of the target server. The signature refers to a signature added by the target server to the qualification information for the first node device by using its own private key.

The target server may perform an audit off-line or on-line. When the audit is performed off-line, an on-line operation of the target server is affected, and efficiency and credibility of the audit may be improved based on processes, such as arrangement and analysis, manually performed on the credential data. When the audit is performed on-line, a real-time property of the audit may be improved, and labor costs may be reduced.

S203. The target server transmits the credential data to the first node device.

The target server sends the credential data to the first node device, to help the first node device may initiate a candidate addition transaction in the chain block system based on the credential data.

S204. The first node device broadcasts candidate addition transaction data (e.g., transaction data of adding the first node device as a candidate representative node device) in the blockchain system based on the credential data (e.g., credential data corresponding to the first node device received from the target server); the candidate addition transaction data including the credential data and a list of candidate node devices. The list of candidate node devices includes a plurality of first target node devices, and the credential data includes credential data corresponding to a plurality of first target node devices.

The first node device initiates a candidate addition transaction in the blockchain system, to help the first node device become a candidate node device. The broadcast makes all node devices in the blockchain system receive the candidate addition transaction data.

In one embodiment of the present disclosure, an example in which the first node device applies to become the candidate node device, and the first node device sends the candidate addition transaction data is used for description. However, in some embodiments, a node device that transmits the candidate addition transaction data may be any node device in the blockchain system, and the node device that receives the candidate addition transaction data may be any node device in the blockchain system. No limitation is imposed in the embodiments of the present disclosure.

S205. Second node devices receive the candidate addition transaction data.

The second node devices are node devices other than the first node device. None of the attributes, such as "first", "second", and "third", included in the embodiments of the present disclosure is used for differentiating functions of the node devices, and instead, the attributes are only used for differentiating different node devices.

S206. A plurality of node devices in the blockchain store the candidate addition transaction data into a target blockchain of the blockchain system when the plurality of node devices in the blockchain system verify the candidate addition transaction data by consensus.

In one embodiment of the present disclosure, that the plurality of node devices verify the candidate addition transaction data by consensus may mean that a plurality of representative node devices in the blockchain system verify the candidate addition transaction data by consensus. The plurality of representative node devices in the blockchain system may be specifically a plurality of representative node devices in the second node devices. When the plurality of representative node devices perform verification on the candidate addition transaction data, at least one of the following verification manners can be adopted:

(1) A representative node device performs verification on validity of the candidate addition transaction data based on whether there are a preset quantity of consent identifiers in the credential data. When there are a preset quantity of consent identifiers in the credential data, the representative node device determines that the candidate addition transaction data is valid. When representative node devices determining that there is a preset quantity of consent identifiers in the credential data in the plurality of representative node devices satisfy a preset consensus achieving condition, a consensus is achieved. The preset consensus achieving condition may be: All the representative node devices determine validity or a preset quantity or a preset ratio of representative node devices in all representative node devices determine validity, and this is not limited in this embodiment of the present disclosure.

(2) A representative node device verifies validity of the candidate addition transaction data based on a validity period of the credential data. When the validity period of the credential data does not expire, the representative node device considers that the candidate addition transaction data is valid, and when a plurality of representative node devices consider that the candidate addition transaction data is valid, a consensus is reached. The credential data may include a plurality of validity periods, and time periods of the validity periods represents may be inconsistent. A validity period that expires earliest in the plurality of validity periods may be adopted to determine whether the candidate addition transaction data is valid.

For a blockchain system that performs an election for a first time, a preset initial representative node device may be used as a node device participating in a consensus process this time. Subsequently, after a plurality of representative node devices are elected, the plurality of representative node devices that are obtained through the election may be switched to a running state of a representative node to participate in a process of consensus and block generation of the entire blockchain system. A node device that is not elected as a representative node device is in a running state of a non-representative node device and does not participate in the process of consensus and block generation of the entire blockchain system.

The foregoing steps S201 to S206 show a process of determining a plurality of candidate node devices in the blockchain system according to the qualification audit performed by the target server on the node devices in the blockchain.

In this case, any node device in the entire blockchain system knows an identity of the first target node device as the candidate node device. Therefore, in the blockchain system, an election may be performed on the plurality of candidate node devices indicated by the candidate addition transaction data, that is, the plurality of first target node devices, to elect a representative node device.

Any node device on the blockchain may perform an election (initiate and/or participate in an election) of the representative node device according to the candidate addition transaction data stored on the target blockchain.

A specific election process is described as follows:

S207. The first node device receives voting transaction data of a user.

Types of transaction data in the blockchain system may include voting transaction data and other transaction data. The voting transaction data may be generated based on a voting target of a user in the blockchain system. The voting transaction data may include: a transaction type, a list of node devices that are voted for, a private key signature of a voting user, and the like.

In one embodiment, a voting target of a user is the candidate node device stored in the blockchain system.

In one embodiment of the present disclosure, a process of electing a representative node device is described by using an example in which a user votes by logging in to the first node device to elect a representative node device. Alternatively, a user may log in to another node device of the blockchain system to vote, and this is not specifically limited in the present disclosure.

S208. The first node device broadcasts the voting transaction data in the blockchain system.

S209. The second node device receive the voting transaction data.

S210. After the second node devices receive the voting transaction data for candidate node devices, when the plurality of node devices in the blockchain system verify the voting transaction data by consensus, store the voting transaction data on the target blockchain of the blockchain system.

In one embodiment of the present disclosure, that the plurality of node devices verify the voting transaction data by consensus may mean that a plurality of current working representative node devices in the blockchain system verify the voting transaction data by consensus.

S211. When a quantity of generated blocks reaches a second preset quantity, the first node device determines a plurality of first blocks in blocks of the target blockchain, the plurality of first blocks being configured to store the voting transaction data of the candidate node devices.

In step S211, the first node device may search the blocks of the target blockchain based on a voting transaction type, to obtain a block storing the voting transaction type as the first block.

In one embodiment of the present disclosure, a plurality of elections may be performed during an operation process of the blockchain system, to avoid a system operation problem caused by an exception of a specific representative node device, for example, a specific representative node device operating in an abnormal state or having a credit problem and the like, thereby ensuring steady operation of the blockchain system based on the representative node device.

Only when the quantity of the generated blocks reaches the second preset quantity, an election is performed, so that a switching time length of a representative node device, that is, how often a representative node device is switched, may be ensured, thereby avoiding switching the representative node device frequently and avoiding affecting normal operation of the entire blockchain system. The generated blocks are blocks generated after a previous election.

It may be understood that the generated blocks include blocks generated based on voting transaction data, may further include blocks generated based on other transaction data, and certainly, may further include blocks generated based on voting transaction data and other transaction data. Details are not described in this embodiment of the present disclosure again.

All the node devices in the blockchain system may execute the process of step S211, and details are not described in this embodiment of the present disclosure again.

S212. The first node device determines, according to the voting transaction data stored in the plurality of first blocks, quantities of votes of the candidate node devices in the blockchain system.

The voting transaction data includes a transaction type, a list of node devices that are voted for, a private key signature of a voting user, and the like. Therefore, according to the voting transaction data stored on respective first blocks, a quantity of votes obtained by each node device may be counted.

In one embodiment of the present disclosure, a voting manner in the blockchain system may be incremental voting. The incremental voting refers to indicating a node device that is voted for in a voting transaction and keeping historical voting results. For example, when a user has voted for three node devices A, B and C, and an object of this voting is a node device D, during this voting, the user may directly vote for the node device D. A list of node devices that are voted for in the voting transaction data carries a public device key of the node device D. That is, the user votes for, through a plurality of rounds of voting, the four node devices A, B, C, and D.

Based on the foregoing incremental voting manner, a vote for a node device that is voted for may be withdrawn. For example, a user has already voted for three node devices A, B and C, and if the user wants to withdraw a vote for the node device C next time, the user may directly indicate withdrawal of the vote for the node device C in the voting transaction data during next voting.

Another manner may be adopted during voting and vote counting, and this is not specifically limited in the present disclosure.

Steps S211 to S212 are actually examples of how to obtain the voting transaction data corresponding to the candidate node devices. Another manner may be adopted in this process, and this is not specifically limited in the present disclosure.

S213. The first node device determines an election result in descending order by a quantity of votes, the election result including public keys of a third preset quantity of representative node devices in the blockchain system and a quantity of votes of each representative node device.

The third preset quantity may be kept consistent with the quantity of current working representative node devices. That is, it can be ensured through setting of the third preset quantity that the current working representative node devices can all be replaced with the elected representative node devices. Certainly, the third preset quantity may alternatively be changed. For example, the third preset quantity may be changed according to the quantity of node devices in the blockchain system, and when the quantity of the node devices is increased, the third preset quantity may be increased.

The first node device may determine whether it is a newly elected representative node device according to the election result determined by itself. That is, any node device in the blockchain system may determine, according to an election result obtained by itself through counting, whether it is a newly elected representative node device, and identities of other representative node devices that are newly elected this time.

Steps S212 to S213 are an implementation of a process of determining, by the first node device according to quantities of votes of the plurality of candidate node devices, a plurality of representative node devices in the blockchain system, that is, a process of determining, according to the voting transaction data stored in the plurality of first blocks, the third preset quantity of representative node devices in the blockchain system. Certainly, another election manner may alternatively be adopted, and this is not specifically limited in the present disclosure.

S214. Switch the current working representative node devices to a candidate node device state for operation, and switch the representative node devices that are newly elected this time to a representative node device state for operation.

Steps S207 to S214 are a representative node device election process of the blockchain system. The blockchain system may also delete the candidate node device, and a specific deletion process may be described as follows:

S215. Any candidate node device broadcasts candidate deletion transaction data in the blockchain system, the candidate deletion transaction data being used for indicating the candidate node device withdraws from the election.

In this case, a node device that meets a qualification requirement for a candidate node device and that withdraws from the election may be referred to as a second target node device. That is, the candidate deletion transaction data is used for indicating that the first target node device is deleted from the candidate node devices.

When any candidate node device no longer wants to be elected as a representative node device, the candidate node device may initiate a candidate deletion transaction in the blockchain system. That is, candidate deletion transaction data is broadcast, so that after receiving the transaction data, each node device may no longer vote for the candidate node device in a next election.

S216. Each node device receives the candidate deletion transaction data.

S217. When a plurality of node devices in the blockchain system verify the candidate deletion transaction data by consensus, the plurality of node devices in the blockchain system store the candidate deletion transaction data on the target blockchain.

When the current working representative node devices in the blockchain system verify the candidate deletion transaction data by consensus, the representative node devices may package the candidate deletion transaction data and generate a block, and send the block to each non-representative node device. The non-representative node device stores the candidate deletion transaction data into the blockchain configured by the non-representative node device, so that all the node devices in the blockchain system maintain a list of candidate node devices together. Therefore, in the next election, the candidate node device loses candidacy, and the user would not vote for the candidate node device.

S218. Switch the second target node device to an ordinary node device state for operation.

If the second target node has paid, to become a representative node device, a deposit to the target server, but at this point the second target node device has switched to the ordinary node device, indicating that the second target node device will not become a representative node device, the target server needs to refund the deposit paid by the candidate node device along an original path. That is, the method also includes: receiving target transaction data, the target transaction data being used for refunding the deposit to an account of the second target node device. The target transaction data can be initiated by the target server as a node device in the blockchain system, or by the target server through any node device in the blockchain system, and this is not limited in embodiments of the present disclosure.

Steps S215 to S218 are a candidate node device deletion process, and may occur in any time period in which there is a candidate node device in the blockchain system. No specific limitation is imposed in this embodiment. In addition, the candidate node device may alternatively be deleted in another deletion manner, and this is not limited in this embodiment.

According to the method provided in one embodiment of the present disclosure, a qualification audit is performed on node devices in the blockchain system by using a target server, and credential data is transmitted to the audited node devices based on an audit result, to prove that the node devices may become candidate node devices. The node devices may initiate, based on the credential data, a candidate addition transaction in the blockchain system, and determine candidate node devices according to a preset rule, so that the blockchain system may elect representative nodes device only from the candidate node devices, to perform an election only from the candidate node devices without electing the candidate node devices from all the node devices in the blockchain system, thereby improving efficiency of an election for the representative node devices in the blockchain system.

Further, in the election process, quantities of votes of respective node devices in the blockchain system are counted only at an interval of a time of generating a preset quantity of blocks, to further elect representative node devices. In this way, a switching time length of representative node devices may be controlled to ensure the switching time length of the representative node devices, so that the representative node devices are not frequently switched, and the blockchain system may normally operate. The representative node device replaces all the node devices in the blockchain system to perform work such as generating a block and performing verification on the block by consensus, thereby not only avoiding the node nodes from all executing the foregoing process, to greatly improve working efficiency of the blockchain system, but also ensuring qualification of the representative node devices, to make the blockchain system operate more efficiently. In addition, deletion of a candidate node device that does not meet the qualification requirement may further improve qualification of the representative node devices, thereby improving working efficiency of the representative node devices.

In the foregoing embodiment, one target server is used to audit node devices in the blockchain system, while in some embodiments, a plurality of target servers may be used to audit node devices in the blockchain system, and descriptions are provided below.

Figure 3:
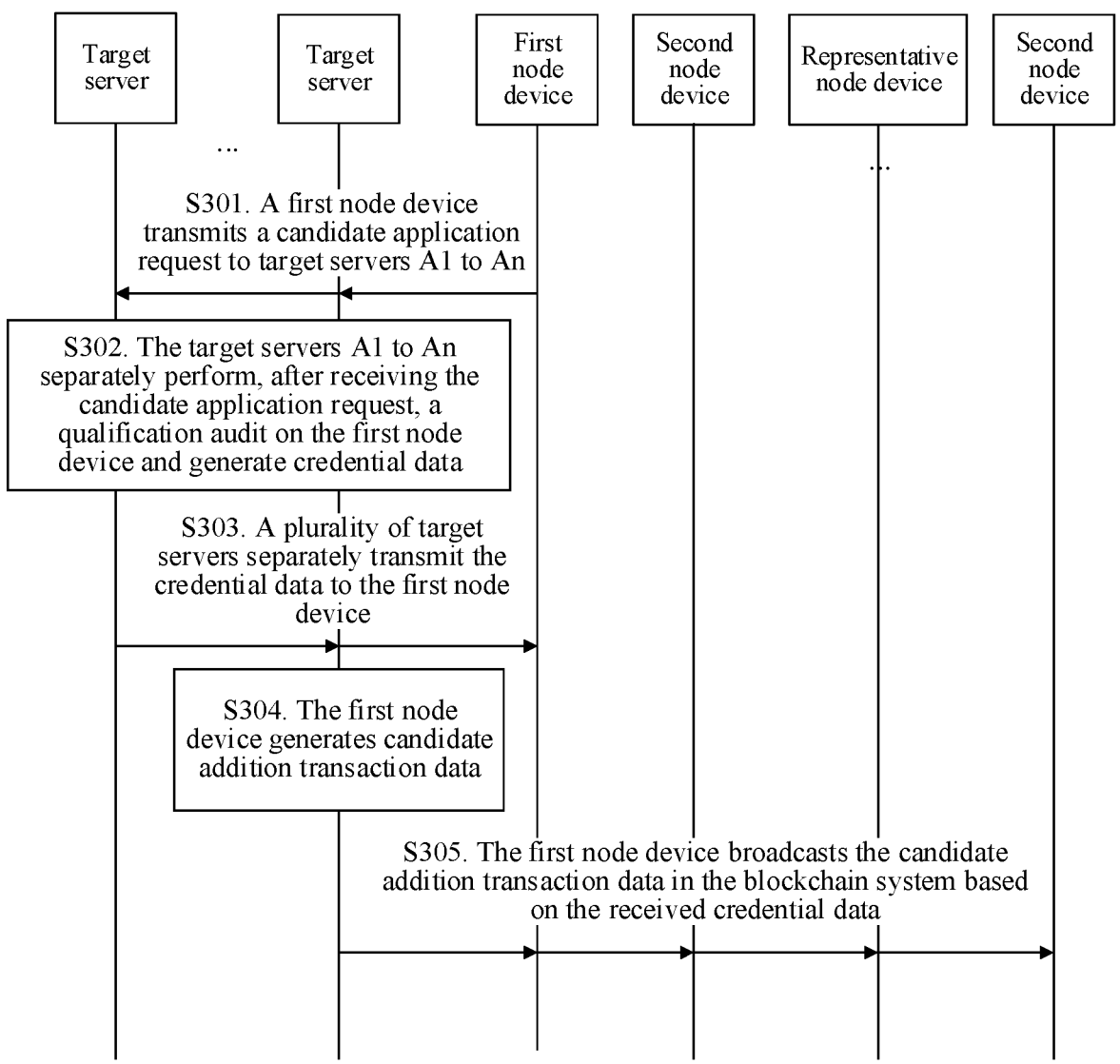
FIG. 3 is a flowchart of a qualification auditing process on a node device according to an embodiment of the present disclosure.

FIG. 3 is a flowchart of a qualification auditing process on a node device according to an embodiment of the present disclosure. Referring to FIG. 3, the process of the method of one embodiment includes the following steps.

S301. A first node device transmits a candidate application request to target servers A1 to An, the candidate application request carrying qualification information of the first node device.

The target servers A1 to An are configured to perform a qualification audit on the node device in the blockchain system. If the target servers A1 to An perform verification and verify a node device, the node device may be determined as a candidate node device. In one embodiment of the present disclosure, descriptions are provided by using only an example in which a plurality of target servers perform a qualification audit together. In one embodiment, step S301 may have the following two implementations:

First implementation: The first node device transmits the candidate application request to one of the plurality of target servers. The target server transmits the candidate application request to other target servers, so that other target servers can receive the candidate application request.

Second implementation: The first node device transmits the candidate application request to all the target servers in the plurality of target servers, so that all the target servers can receive the candidate application request. Certainly, the first node device may alternatively transmit the candidate application request to some of the target servers, and the target servers forward the received candidate application request to other target servers, so that the other target servers can receive the candidate application request. Which transmitting manner is specifically adopted is not specifically limited in this embodiment of the present disclosure.

The candidate application request refers to a request through which the first node device applies to any target server for becoming a candidate device node. The qualification information of the first node device carried in the candidate application request may be any one of the following three qualifications: device performance of the first node device; a deposit of a preset amount that has been paid by the node device to the target server; and a credit value of a user account corresponding to the first node device Certainly, the qualification information may alternatively include other content, and this is not limited in this embodiment S302. The target servers A1 to An separately perform, after receiving the candidate application request, a qualification audit on the first node device and generate credential data.

After the target servers A1 to An audit the qualification information of the first node device, credentialed transaction data is generated respectively for the target servers verify the qualification information. The credential data may include a consent identifier, a generation time of a credential, a validity period of the credential, and a signature of the target server. The consent identifier refers to an identifier indicating that the target server consents to let the first node device become the candidate node device; the validity period can prevent a non-representative node device from becoming a representative node device by using credential data that expires; and the signature is a signature added by the target server to the qualification information by using a private key of the target server. The credential data generated by the target server may alternatively be credential data generated based on audit results of terminal devices associated with the target servers, for example, step S202. Details are not provided in this embodiment of the present disclosure again.

S303. A plurality of target servers separately transmit the credential data to the first node device, the plurality of target servers being servers of an auditor.

The plurality of target servers separately transmit the credential data to the first node device, so that the first node device may receive the credential data and initiate a candidate addition transaction to the blockchain system based on the credential data.

However, in some embodiments, one target server may be selected from the plurality of target servers, and other target servers that pass the audit may transmit credential data generated by themselves to the target server. The target server summarizes all the pieces of credential data into a single piece of credential data, and transmits the piece of credential data to the first node device.

S304. The first node device generates candidate addition transaction data.

S305. The first node device broadcasts the candidate addition transaction data in the blockchain system based on the received credential data, the candidate addition transaction data including the credential data and a list of candidate node devices.

The first node device initiates the candidate addition transaction to any node device of the blockchain system, so that the first node device may become a candidate node device.

Steps S301 to S305 are a process in which a plurality of target servers perform an audit to determine whether a node device has a qualification of becoming a candidate node device. For a process in which the first node device becomes the candidate node device and a process of electing representative node devices in the blockchain system, reference may be made to S205 to S218, and details are not provided therein again.

In one embodiment, a plurality of target servers are configured to audit the node devices in the blockchain system, to avoid that thee audit cannot be performed normally when a specific target server is faulty, and a qualification of a node device that passes the audit performed by the plurality of target servers is more reliable.

All the foregoing optional technical solutions may be arbitrarily combined to form an optional embodiment of the present disclosure, and details are not described herein.

Figure 4:
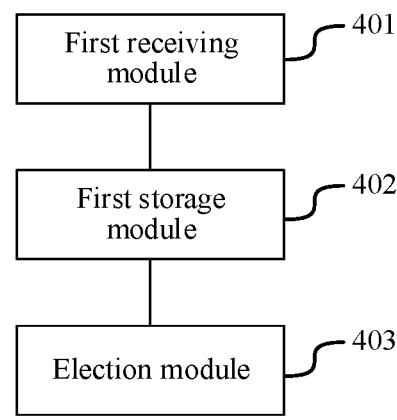
FIG. 4 is a schematic structural diagram of an apparatus for electing a representative node device according to an embodiment of the present disclosure.

FIG. 4 is a schematic structural diagram of an apparatus for electing a representative node device according to an embodiment of the present disclosure. Referring to FIG. 4, a first receiving module 401, a first storage module 402, and an election module 403 are included. The apparatus may be applied in a first node device in a blockchain system.

The first receiving module 401 is connected to the first storage module 402 and is configured to generate and broadcast candidate addition transaction data so that other node devices in the blockchain system receives the candidate addition transaction data, the candidate addition transaction data carrying credential data, the credential data being received from a target server and indicating that a first node device meets a qualification requirement for a candidate node device.

The first storage module 402 is connected to the election module 403 and is configured to store the candidate addition transaction data on a target blockchain of the blockchain system when a plurality of node devices in the blockchain system verify the candidate addition transaction data by consensus.

The election module 403 is configured to initiate and/or participate in an election of the representative node device (e.g. an election of electing the first node device as a representative node device) according to the candidate addition transaction data stored on the target blockchain.

In an embodiment, the credential data include signature data of a plurality of auditing users.

In an embodiment, the device further includes:
a transmitting module, configured to transmit a candidate application request to a target server, the candidate application request carrying qualification information of the first node device.

In an embodiment, the target server is any node device in the blockchain system; or
the target server is a server of a third party organization associated with the blockchain system.

In an embodiment, the first target node device meets at least one of the following conditions:
device performance of the first node device meets a preset performance condition;
the first node device has paid a preset amount of deposit; and
credit of a user corresponding to the first node device meets a preset credit condition.

In an embodiment, that the plurality of node devices in the blockchain system verify the candidate addition transaction data by consensus means that a plurality of representative node devices in the blockchain system verify the candidate addition transaction data by consensus.

In an embodiment, the device further includes:
a second receiving module, configured to receive candidate deletion transaction data, the candidate deletion transaction data being used for indicating deleting a second target node device from the candidate node devices; and
a second storage module, configured to store the candidate deletion transaction data on the target blockchain of the blockchain system when the plurality of node devices in the blockchain system verify the candidate deletion transaction data by consensus.

In an embodiment, the device further includes:
a third receiving module, configured to receive target transaction data, the target transaction data being used for refunding the deposit to an account of the second target node device.

According to the apparatus provided in one embodiment of the present disclosure, a qualification audit is performed on node devices in the blockchain system by using an auditor, and credential data is transmitted to the audited node devices based on an audit result, to prove whether the node devices can become candidate node devices. The node devices may initiate, based on the credential data, a candidate addition transaction in the blockchain system, and determine candidate node devices according to a preset rule, so that the blockchain system may elect representative nodes device only from the candidate node devices, to perform an election only from the candidate node devices while avoiding electing the candidate node devices from all the node devices in the blockchain system, thereby improving efficiency of an election for the representative node devices in the blockchain system.

Figure 5:
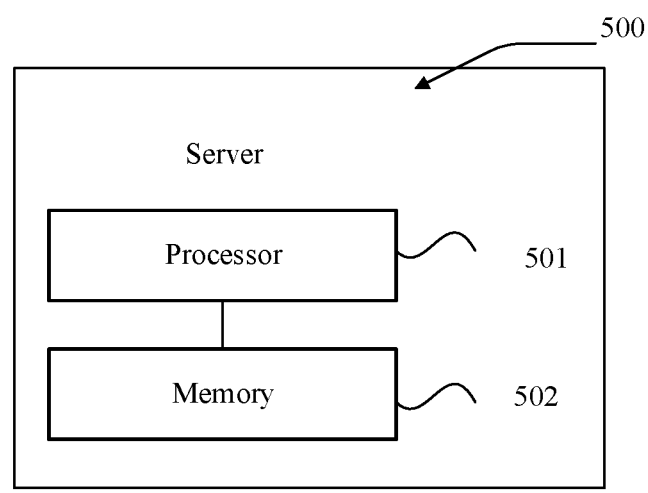
FIG. 5 is a schematic structural diagram of a server according to an embodiment of the present disclosure.

FIG. 5 is a schematic structural diagram of a server according to an embodiment of the present disclosure. The server 500 may vary greatly due to different configurations or different performance, and may include one or more central processing units (CPUs) 501 and one or more memories 502. The memory 502 stores computer-readable instructions, the computer-readable instructions being loaded and executed by the processor 501 to implement methods according to the foregoing method embodiments. Certainly, the server may further include components such as a wired or wireless network interface, a keyboard, and an input/output interface, to facilitate inputs/outputs. The server may further include another component configured to implement functions of a device, and details are not described herein again.

In an exemplary embodiment, a computer-readable storage medium, for example, a memory including instructions, is further provided. The instructions may be executed by a processor in a terminal, to complete the method for electing a representative node device in the foregoing embodiments. For example, the computer-readable storage medium may be a read-only memory (ROM), a random access memory (RAM), a compact disc read-only memory (CD-ROM), a magnetic tape, a floppy disk, an optical data storage device, or the like.

A person of ordinary skill in the art may understand that all or some of the steps of the foregoing embodiments may be implemented by using hardware, or may be implemented by a program instructing relevant hardware. The program may be stored in a computer-readable storage medium. The above-mentioned storage medium may be a read-only memory, a magnetic disk, an optical disc, and the like.

The foregoing descriptions are merely exemplary embodiments of the present disclosure, but are not intended to limit the present disclosure. Any modification, equivalent replacement, or improvement made without departing from the spirit and principle of the present disclosure is to fall within the protection scope of the present disclosure.

What is claimed is:

1. A method for electing a representative node device, performed by a first node device, the first node device being any node device of a plurality of node devices in a blockchain system, the method comprising:
   transmitting a candidate application request to a plurality of servers, the plurality of servers including a target server, the candidate application request carrying qualification information of the first node device, and the qualification information comprising: a device performance of the first node device and a credit of a user corresponding to the first node device;
   receiving credential data from the target server in response to a qualification audit on the first node device being performed based on the qualification information and a result of the qualification audit indicating that the first node device meeting a qualification requirement for becoming a candidate node device, wherein the credential data is summarized based on a plurality of pieces of credential data generated by the plurality of servers in response to the candidate application request;
   broadcasting candidate addition transaction data in the blockchain system, the candidate addition transaction data carrying the credential data;
   storing the candidate addition transaction data on a target blockchain of the blockchain system based on verification results of the candidate addition transaction data performed by the plurality of node devices in the blockchain system through a consensus mechanism; and
   participating in an election of the representative node device according to the candidate addition transaction data stored on the target blockchain,
   wherein the plurality of node devices comprises representative node devices and non-representative node devices, the non-representative node devices comprise ordinary node devices and candidate node devices, and after the storing the candidate addition transaction data on the target blockchain of the blockchain system, the method further comprises:
   receiving candidate deletion transaction data, the candidate deletion transaction data indicating deleting a second target node device from the candidate node devices; and
   storing the candidate deletion transaction data on the target blockchain of the blockchain system in response to the plurality of node devices in the blockchain system verifying the candidate deletion transaction data by consensus;
   wherein the second target node device is switched from a candidate node device state to an ordinary node device state, wherein a representative node device is configured to generate a block and perform verification on the block by consensus, a non-representative node device is configured to receive the block verified by the representative node device by consensus, perform verification on the block, and store the verified block on the target blockchain, a node device at the candidate node device state is eligible of being elected as a representative node device, and the second target node device at the ordinary node device state is withdrawn from the election of becoming a representative node device.

2. The method according to claim 1, wherein the credential data comprises signature data of a plurality of auditing users.

3. The method according to claim 1, wherein the target server is any node device in the blockchain system; or
   the target server is a server of a third party organization associated with the blockchain system.

4. The method according to claim 1, further comprising:
   determining whether the first node device meets the qualification requirement for the candidate node device based on at least one of the following: whether the device performance of the first node device meets a preset performance condition, whether the first node device has paid a preset amount of deposit, or whether the credit of the user corresponding to the first node device meets a preset credit condition.

5. The method according to claim 1, wherein that the plurality of node devices in the blockchain system verify the candidate addition transaction data by consensus includes that a plurality of representative node devices in the blockchain system verify the candidate addition transaction data by consensus.

6. The method according to claim 1, wherein the candidate addition transaction data further carries a list of candidate node devices; and the storing the candidate addition transaction data on the target blockchain of the blockchain system in response to the plurality of node devices in the blockchain system verifying the candidate addition transaction data by consensus comprises:
   receiving the candidate addition transaction data through second node devices, the second node devices being node devices other than the first node device in the blockchain system; and
   storing the candidate addition transaction data on the target blockchain of the blockchain system in response to a plurality of representative node devices in the second node devices verifying the candidate addition transaction data by consensus.

7. The method according to claim 1, wherein after the storing the candidate deletion transaction data on the target blockchain of the blockchain system, the method further comprises:
receiving target transaction data, the target transaction data being used for refunding a deposit to an account of the second target node device, the deposit being previously paid by the second target node device for being at the candidate node device state.

8. The method to claim 1, wherein the consensus mechanism comprises:
generating, by one of the representative node devices, a block;
calculating, by the representative node device, a hash value of a block header of the generated block;
recalculating, by the representative node device, the hash value in response to that the hash value is greater than a target value by changing a random number in the generated block;
in response to that the hash value or a recalculated hash value is less than or equal to the target value, broadcasting, by the representative node device, the generated block as a first block to a plurality of representative node devices or in the blockchain system, each representative node device in the plurality of representative node devices performs verification on the first block, the verification comprising:
identifying a first preset consensus achieving condition in the credential data, the first preset consensus achieving condition includes a validity period of the credential data; and
determining, by the each representative node device, a verification result of the candidate addition transaction data by determining whether the first preset consensus achieving condition is achieved.

9. The method to claim 8, wherein a second preset consensus achieving condition further includes a preset quantity of validity in the plurality of node devices or preset ratio of validity in the plurality of node devices; and
the verification results of the candidate addition transaction data are determined by determining whether both the first and second preset consensus achieving conditions are achieved.

10. The method according to claim 7, wherein the deposit is refunded along an original path used by the second target node device for being at the candidate node device state.

11. A blockchain system comprising a plurality of node devices for electing a representative node device, a first node device comprising: a memory and a processor coupled to the memory, the first node device being any node device of the plurality of node devices, the processor being configured to:
transmit a candidate application request to a plurality of servers, the plurality of servers including a target server, the candidate application request carrying qualification information of the first node device, and the qualification information comprising: a device performance of the first node device and a credit of a user corresponding to the first node device;
receive credential data from the target server in response to a qualification audit on the first node device being performed based on the qualification information and a result of the qualification audit indicating that the first node device meeting a qualification requirement for becoming a candidate node device, wherein the credential data is summarized based on a plurality of pieces of credential data generated by the plurality of servers in response to the candidate application request;
broadcast candidate addition transaction data in the blockchain system, the candidate addition transaction data carrying the credential data;
store the candidate addition transaction data on a target blockchain of the blockchain system based on verification results of the candidate addition transaction data performed by the plurality of node devices in the blockchain system through a consensus mechanism; and
participate in an election of the representative node device according to the candidate addition transaction data stored on the target blockchain,
wherein the plurality of node devices comprises representative node devices and non-representative node devices, the non-representative node devices comprise ordinary node devices and candidate node devices, and after the storing the candidate addition transaction data on the target blockchain of the blockchain system, the processor is further configured to perform:
receiving candidate deletion transaction data, the candidate deletion transaction data indicating deleting a second target node device from the candidate node devices; and
storing the candidate deletion transaction data on the target blockchain of the blockchain system in response to the plurality of node devices in the blockchain system verifying the candidate deletion transaction data by consensus;
wherein the second target node device is switched from a candidate node device state to an ordinary node device state, wherein a representative node device is configured to generate a block and perform verification on the block by consensus, a non-representative node device is configured to receive the block verified by the representative node device by consensus, perform verification on the block, and store the verified block on the target blockchain, a node device at the candidate node device state is eligible of being elected as a representative node device, and the second target node device at the ordinary node device state is withdrawn from the election of becoming a representative node device.

12. The blockchain system according to claim 11, wherein the credential data comprising signature data of a plurality of auditing users.

13. The blockchain system according to claim 11, wherein the target server is any node device in the blockchain system; or
the target server is a server of a third party organization associated with the blockchain system.

14. The blockchain system according to claim 11, wherein that the first node device meets the qualification requirement for the candidate node device comprises at least one of the following: device performance of the first node device meets a preset performance condition, the first node device has paid a preset amount of deposit, or credit of a user corresponding to the first node device meets a preset credit condition.

15. The blockchain system according to claim 11, wherein that the plurality of node devices in the blockchain system verify the candidate addition transaction data by consensus includes that a plurality of representative node devices in the blockchain system verify the candidate addition transaction data by consensus.

16. The blockchain system according to claim 11, wherein the candidate addition transaction data further carries a list of candidate node devices; and the processor is further configured to: receive the candidate addition transaction data through second node devices, the second node devices being node devices other than the first node device in the blockchain system; and store the candidate addition transaction data on the target blockchain of the blockchain system in response to a plurality of representative node devices in the second node devices verifying the candidate addition transaction data by consensus.

17. The blockchain system according to claim 11, wherein the processor is further configured to:
receive target transaction data, the target transaction data being used for refunding the deposit to an account of the second target node device.

18. A non-transitory computer-readable storage medium, storing computer-readable instructions, the computer-readable instructions, when executed by one or more processors of a first node device in a blockchain system, causing the one or more processors to perform:
transmitting a candidate application request to a plurality of servers, the plurality of servers including a target server, the candidate application request carrying qualification information of the first node device, and the qualification information comprising: a device performance of the first node device and a credit of a user corresponding to the first node device, wherein the first node device is any node device of a plurality of node devices in the blockchain system;
receiving credential data from the target server in response to a qualification audit on the first node device being performed based on the qualification information and a result of the qualification audit indicating that the first node device meeting a qualification requirement for becoming a candidate node device, wherein the credential data is summarized based on a plurality of pieces of credential data generated by the plurality of servers in response to the candidate application request;
broadcasting candidate addition transaction data in the blockchain system, the candidate addition transaction data carrying the credential data;
storing the candidate addition transaction data on a target blockchain of the blockchain system based on verification results of the candidate addition transaction data performed by the plurality of node devices in the blockchain system through a consensus mechanism; and
participating in an election of the representative node device according to the candidate addition transaction data stored on the target blockchain,
wherein the plurality of node devices comprises representative node devices and non-representative node devices, the non-representative node devices comprise ordinary node devices and candidate node devices, and after the storing the candidate addition transaction data on the target blockchain of the blockchain system, the one or more processors are further configured to perform:
receiving candidate deletion transaction data, the candidate deletion transaction data indicating deleting a second target node device from the candidate node devices; and
storing the candidate deletion transaction data on the target blockchain of the blockchain system in response to the plurality of node devices in the blockchain system verifying the candidate deletion transaction data by consensus;
wherein the second target node device is switched from a candidate node device state to an ordinary node device state, wherein a representative node device is configured to generate a block and perform verification on the block by consensus, a non-representative node device is configured to receive the block verified by the representative node device by consensus, perform verification on the block, and store the verified block on the target blockchain, a node device at the candidate node device state is eligible of being elected as a representative node device, and the second target node device at the ordinary node device state is withdrawn from the election of becoming a representative node device.

* * * * *